UNITED STATES PATENT OFFICE.

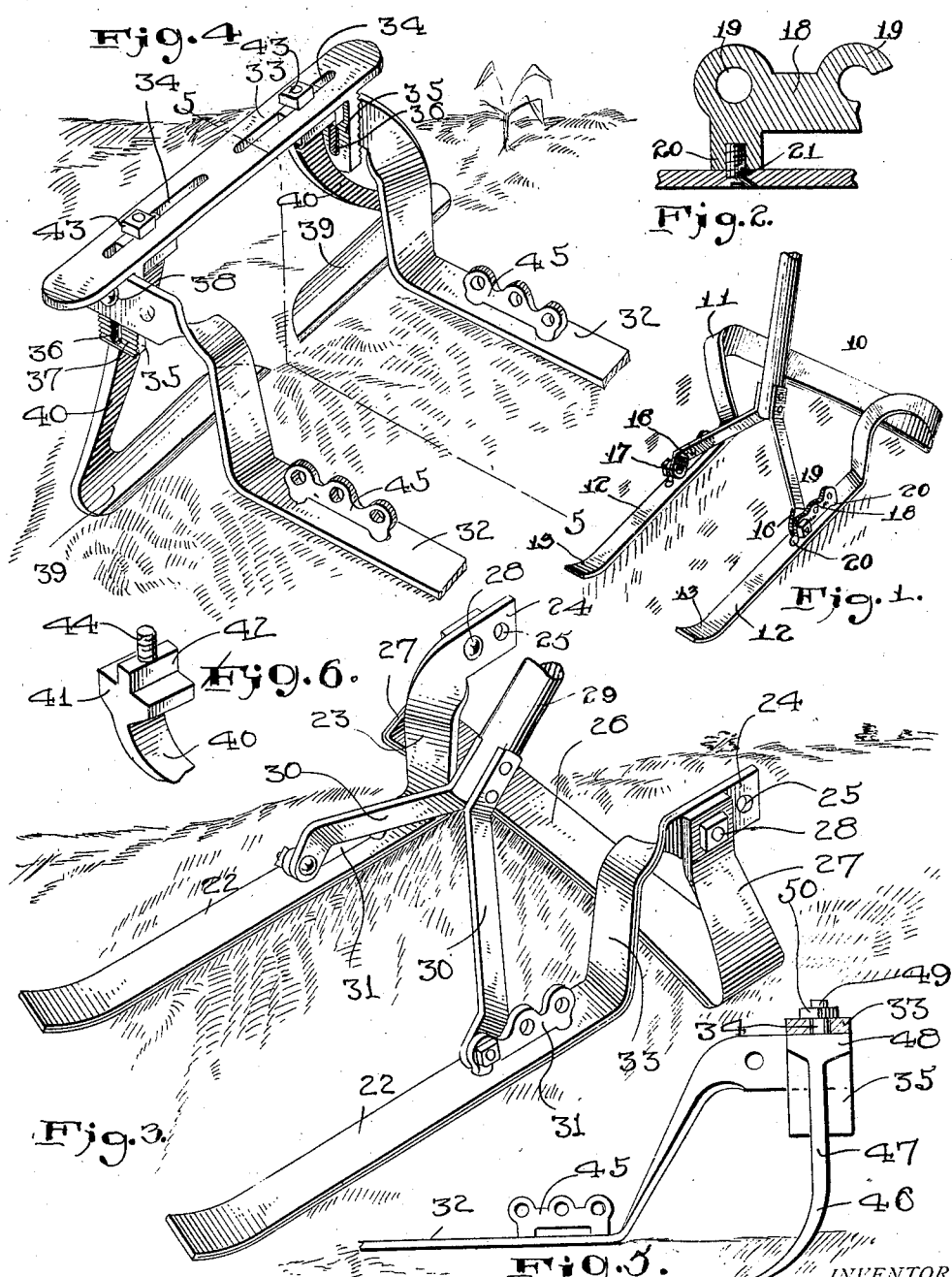

NORMAN McASLAN, OF BRUCE, WISCONSIN.

CULTIVATOR.

1,079,421.	Specification of Letters Patent.	Patented Nov. 25, 1913.

Application filed November 1, 1912. Serial No. 729,099.

*To all whom it may concern:*

Be it known that I, NORMAN McASLAN, citizen of the United States, residing at Bruce, in the county of Rusk and State of Wisconsin, have invented certain new and useful Improvements in Cultivators, of which the following is a specification, reference being had therein to the accompanying drawing.

This invention relates to cultivators, and the principal object of the same is to provide a cultivator device of the type described which will operate very easily and which may be very cheaply produced.

Another object of the invention is to provide a cultivator of the type described in which the cutting blade may be adjusted.

Another object of the invention is to provide a hand cultivator in which blades somewhat similar to those used in horse cultivators may be removably connected with the supporting bars.

This invention is illustrated in the accompanying drawings, wherein:—

Figure 1 is a perspective view of one type of cultivator. Fig. 2 is a fragmentary sectional view showing the manner of holding the securing plates for the handle in place. Fig. 3 is a perspective view of a modified form of cultivator in which the cutting blade may be angularly adjusted. Fig. 4 is a perspective view of a modified type of cultivator having removable and adjustable cutting blades. Fig. 5 is a sectional view along the line 5—5, in Fig. 4 showing the cultivator in Fig. 4 provided with a modified type of cutting blade. Fig. 6 is a perspective view of the upper end of one of the blades shown in Fig. 4.

Referring to Fig. 1 of the drawings, it will be seen that the supporting runners and cutting blades of this device may be formed from a single piece of steel bent intermediate its length to form the cutting blade 10 from which there extends the curved arms 11 terminating in the runners 12 which have upturned forward ends 13. The runners 12 cause the device to move easily over the ground, and the curved arms 11 are curved at such an angle that the cutting blade 10 will easily cut into the ground thus removing any weeds or grass growing between the rows of plants and cutting up the ground in order to permit rain to easily sink into the ground. A handle 14 is provided with bars 15 at its lower end, the bars 15 having their lower end portions 16 bent as shown in the figure and provided with openings through which bolts 17 may pass in order to pivotally connect the handle with the brackets 18. These brackets 18 are provided with pivot ears 19 through which the bolts 17 pass so that the handle may be adjustably connected with the brackets thus permitting the handle to be moved in order to cause the cultivator to work easily. Studs 20 are at the ends of the brackets 18, and screws 21 are passed through the runners 12 and into the studs 20 in order to hold the brackets in position. When this device is in use, the handle is grasped and the cultivator pushed along the ground between the rows of plants so that the cutting blade 10 will remove the weeds and loosen the dirt between the rows. The runners 12 cause the device to ride easily thus preventing the device from having any transverse rocking motion when going over rough ground.

In Fig. 3 there has been shown a modified form of cultivator and in this figure the runners 22 are formed from separate strips of metal and have their end portions 23 bent upwardly and then twisted and carried rearwardly with their rear end portions 24 provided with the openings 25. A cutting blade 26 has its end portions 27 bent upwardly and provided with openings through which securing bolts 28 may be passed, the bolts passing through the openings 25 and thus securing the cutting blade to the rear end portions of the runners. It will readily be seen by this construction that this blade may be removed after it becomes dulled and be sharpened and that the angle of the blade may be adjusted before tightening the bolt thus permitting the blade to either scrape along the top of the ground thus simply removing the weeds, or to cut deeply into the ground. A handle 29 is provided with arms 30 similar to the arms 15, and these arms are pivotally connected with the brackets 31 similar in construction to the brackets 18. The operation of this device is similar to that of Fig. 1.

In Fig. 4 the runners 32 are constructed similar to those shown in Fig. 3 and have their rear end portions connected by a bar 33 provided with longitudinally extending slots 34. Arms 35 extend from the bar 33 and are provided with longitudinally extending slots 36 so that the arms may be vertically adjusted thus regulating the depth at which the blades carried by the bar will cut. Corrugations 37 are formed upon the outer faces of the arms 35 so that when the bolts 38 are tightened there will be no danger of their slipping. Cutting blades are carried by the bar 33 and each comprises the lower cutting section 39 from which there extends the shanks 40 extending inwardly and terminating in an enlarged upper end portion 41. A block 42 extends from the enlarged end 41 and passes through the slot 34 so that the cutting blade will be prevented from turning out of the position shown in Fig. 4 when the device is in use. Nuts 43 are screwed upon the threaded extensions 44 in order to hold the blades in position. From an inspection of Fig. 4 it will readily be seen that these cutting blades may be moved in the slots 34 thus bringing the inner ends of the blades as near together as desired, or as far apart as desired. This will permit the blades to travel along each side of a row of plants and thus cut the weeds and dirt on each side of the plants if desired. Brackets 45 are carried by the runners 32 so that a handle similar to that shown in Fig. 3 may be connected with the runners.

In Fig. 5 a slightly modified form of cutting blade has been shown, and this blade is very similar to that used in horse cultivators. The cutting blades 46 are provided with curved lower end portions and have their shanks 47 terminating in the enlarged end portions 48 from which there extends a threaded extension 49 which passes through the slot 34 and is held in place by means of the nut 50.

Having thus described the invention, what is claimed as new, is:—

1. A cultivator comprising a set of runners, cutting means, brackets carried by said runners, each comprising a body portion provided with a plurality of openings, studs extending from said body portion and secured to one of said runners, a handle, and securing means for said handle passing through a selected set of openings.

2. A cultivator comprising a set of runners having upturned rear end portions, a transversely extending cutting blade formed integral with said runners and having upturned end portions merging into the upturned end portions of said runners, and a handle connected with said runners.

3. A device of the character described comprising a strip of material bent intermediate its length to form an operating element having supporting arms extending therefrom, and a handle connected with said arms.

In testimony whereof I hereunto affix my signature in presence of two witnesses.

NORMAN McASLAN.

Witnesses:
 CLEMENT WILCOX,
 A. P. ANDREWS.